US008253594B2

(12) United States Patent
Wang et al.

(10) Patent No.: US 8,253,594 B2
(45) Date of Patent: Aug. 28, 2012

(54) KEYBOARD

(75) Inventors: Hai-Li Wang, Shenzhen (CN); Xiang Cao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 941 days.

(21) Appl. No.: 12/269,049

(22) Filed: Nov. 12, 2008

(65) Prior Publication Data

US 2010/0097245 A1  Apr. 22, 2010

(30) Foreign Application Priority Data

Oct. 17, 2008  (CN) .............................. 2008 1 304986

(51) Int. Cl.
*H03M 11/00* (2006.01)
(52) U.S. Cl. ............ 341/20; 345/168; 341/22; 396/428; 396/429; 200/341
(58) Field of Classification Search .................... 341/20, 341/22; 345/168; 396/268, 348, 419, 427, 396/428, 429, 433; 348/151; 200/43.18, 200/401, 315, 318.1, 341
See application file for complete search history.

(56) References Cited

U.S. PATENT DOCUMENTS
2003/0146903 A1 * 8/2003 Yi ................................. 345/168

FOREIGN PATENT DOCUMENTS
CN   2840174 Y   11/2006
CN   201037927 Y   3/2008
* cited by examiner

*Primary Examiner* — Albert Wong
(74) *Attorney, Agent, or Firm* — Altis Law Group, Inc.

(57) ABSTRACT

A keyboard includes a plug, a hub, a keyboard controller, a keyboard circuit, a camera controller, and an image capturing device. The hub includes an output terminal connected to the plug, a first input terminal, and a second input terminal. The keyboard circuit is connected to the first input terminal of the hub via the keyboard controller. The image capturing device is mounted on the keyboard and connected to the second input terminal of the hub via the camera controller. The image capturing device is configured for capturing sensed image signals. The keyboard circuit communicates with the computer via the keyboard controller and the hub, and the image capturing device transmits the sensed image signals to the computer via the camera controller and the hub.

5 Claims, 4 Drawing Sheets

KEYBOARD

BACKGROUND

1. Technical Field

The present disclosure relates to keyboards, and particularly to a multifunctional keyboard.

2. Description of Related Art

A contemporary keyboard as an input device has very simple functions. Designers often focus on improving keys of the keyboard rather than inventing other uses for the keyboard.

What is needed, is a keyboard which overcomes the above-mentioned limitations.

DETAILED DESCRIPTION

Figure 1:
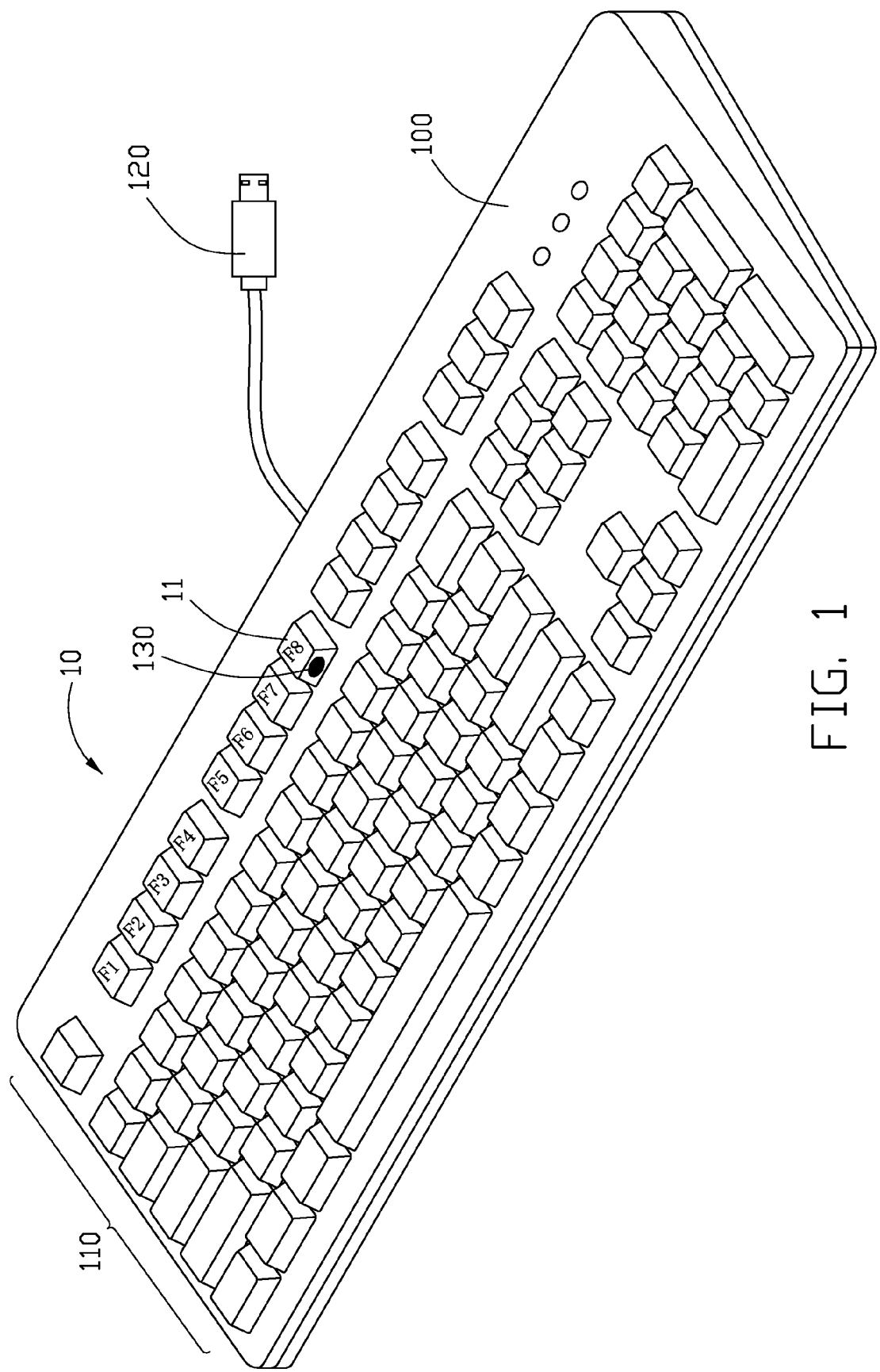
FIG. 1 is an isometric schematic view of an exemplary embodiment of a keyboard.

Referring to FIG. 1, an exemplary embodiment of a keyboard, such as a universal serial bus (USB) keyboard 10, includes a main body 100. The main body 100 includes a key portion 110 having a plurality of keys arranged on the key portion 110, and a plug such as a USB plug 120 configured for connecting to a keyboard interface such as a USB interface of a computer (not shown). A key 11 of the key portion 110 includes an image capturing device such as an optical sensor 130 mounted on a side of the key 11, facing an operational direction of the USB keyboard 10. The optical sensor 130 is configured for capturing sensed image signals. In the illustrated embodiment, the key 11 is an F8 function key, since the F8 function key is arranged on a top and center of the main body 100, which can easily catch images of the user by the optical sensor 130. In other embodiments, the optical sensor 130 can be mounted on any other key of the USB keyboard 10 according to preference. The keyboard can be another type of keyboard such as a PS/2 keyboard in another embodiment.

Figure 2:
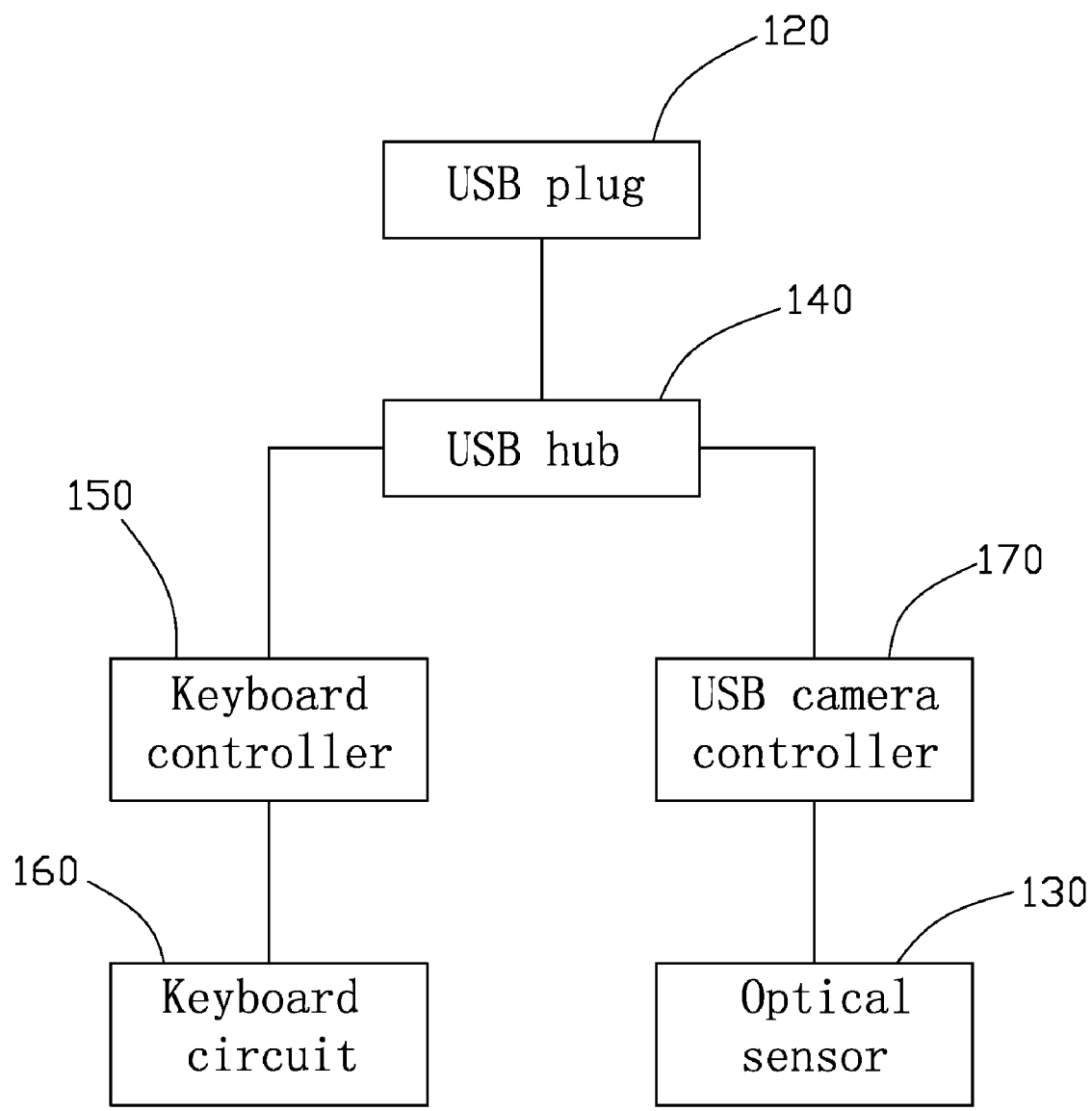
FIG. 2 is a block diagram of FIG. 1.

Referring to FIG. 2, the USB keyboard 10 may further include a hub such as a USB hub 140, a keyboard controller 150, a keyboard circuit 160, and a camera controller such as a USB camera controller 170, arranged in the main body 100. An output terminal of the USB hub 140 is connected to the USB plug 120. A first input terminal of the USB hub 140 is connected to the keyboard circuit 160 via the keyboard controller 150. A second input terminal of the USB hub 140 is connected to the optical sensor 130 via the USB camera controller 170. When the USB plug 120 is connected to the USB interface of the computer, the keyboard circuit 160 communicates with the computer via the keyboard controller 150 and the USB hub 140, and the optical sensor 130 transmits the sensed image signals to the computer via the USB camera controller 170 and the USB hub 140.

Figure 3:
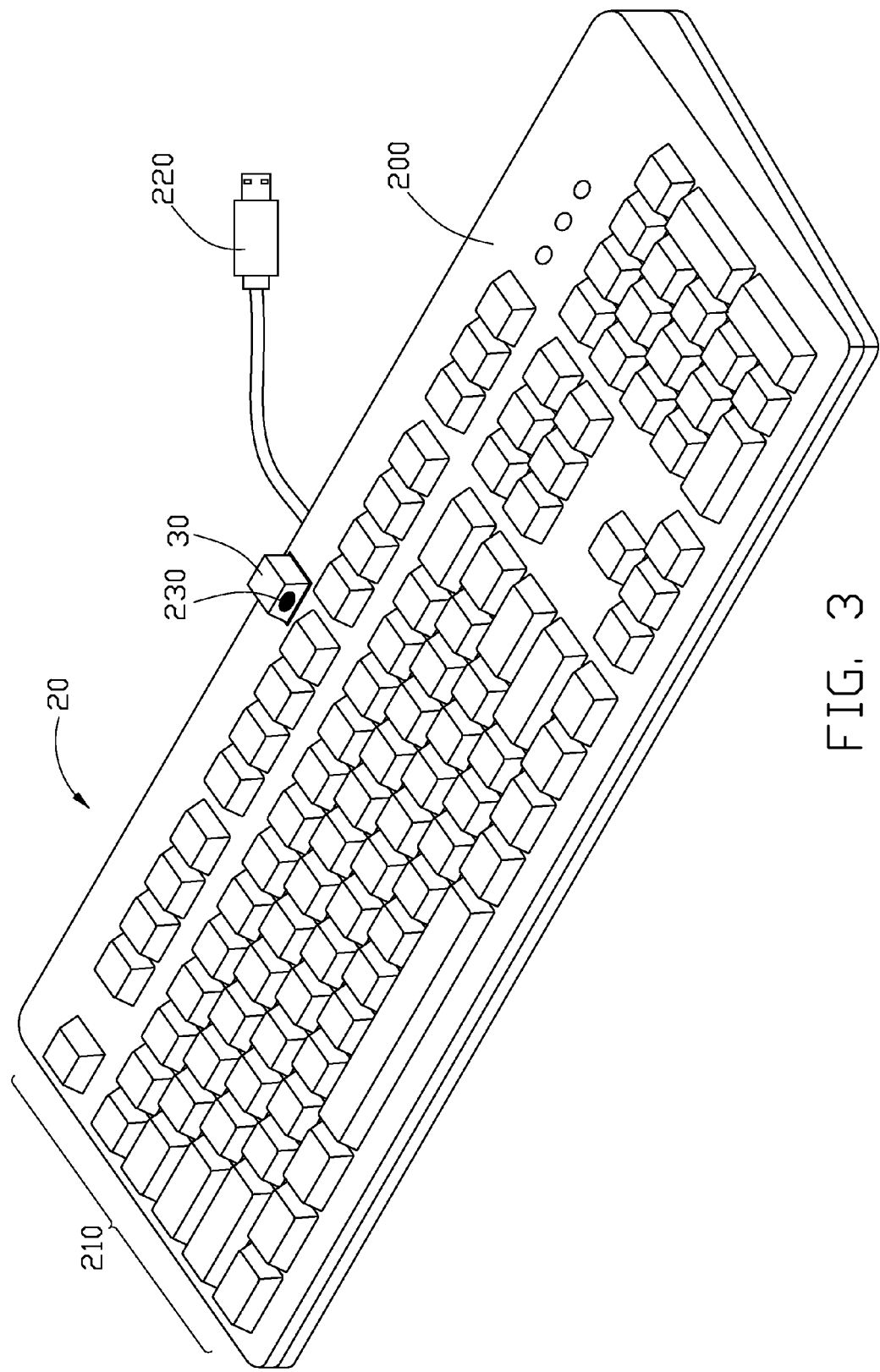
FIG. 3 is an isometric schematic view of an alternative exemplary embodiment of a keyboard.
Figure 4:
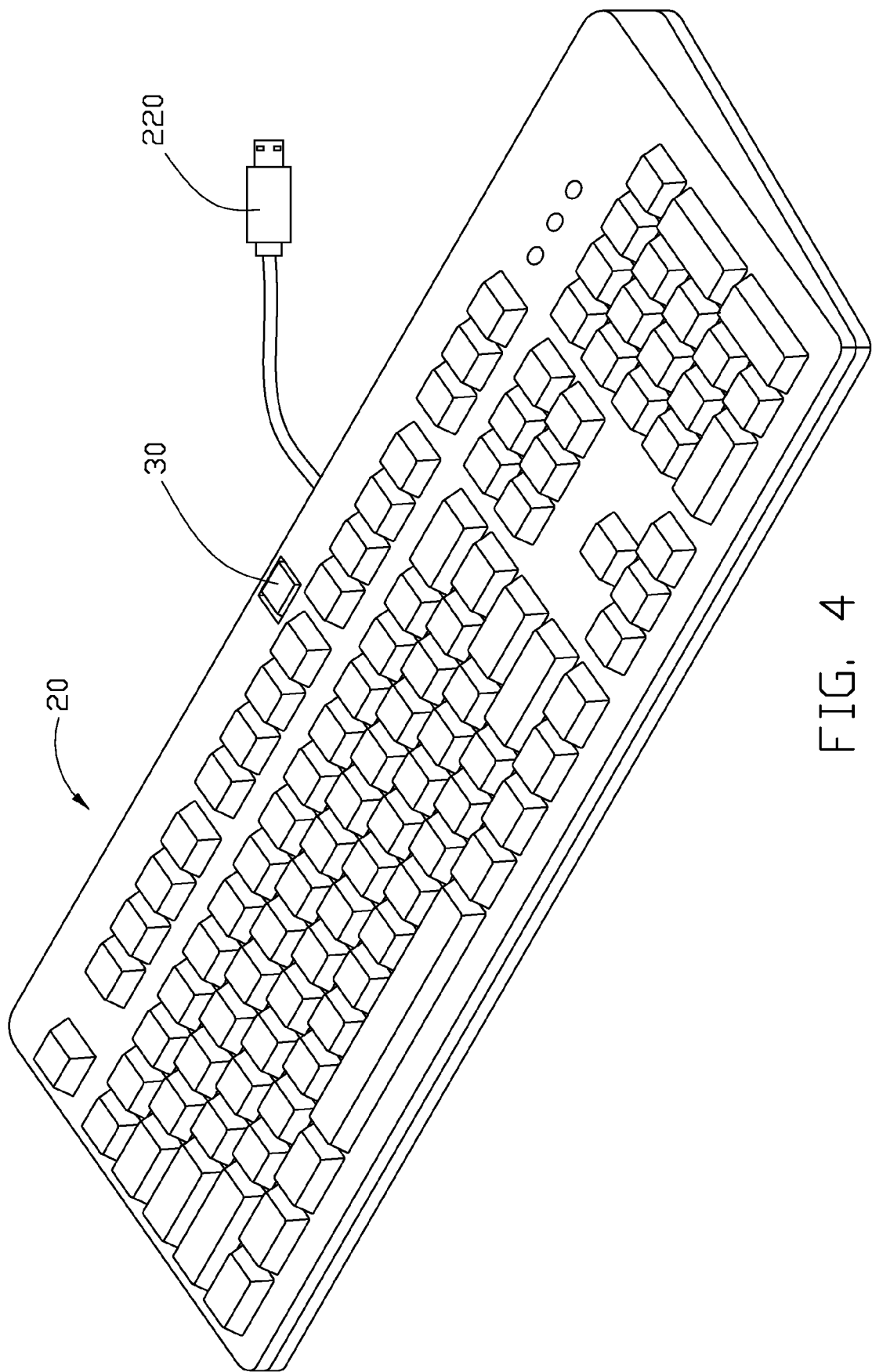
FIG. 4 is similar to FIG. 3 but showing a different using state.

Referring to FIGS. 3 and 4, an alternative exemplary embodiment of a keyboard, such as a USB keyboard 20, includes a main body 200. The main body 200 includes a key portion 210 having a plurality of keys, and a plug such as a USB plug 220 configured for connecting to a keyboard interface such as a USB interface of a computer (not shown). A toggle switch 30 is installed on a top and center of the main body 200. The toggle switch 30 includes an optical sensor 230 mounted on a side of the toggle switch 30, facing an operational direction of the USB keyboard 20. The toggle switch 30 can be toggled to protrude out of the main body 200 when the optical sensor 230 is in operation (see FIG. 3), and then can be pressed again to retract into the main body 200 when the optical sensor is not in operation (see FIG. 4). In one embodiment, the toggle switch 30 can be rotated so as to adjust an image capturing angle of the optical sensor 230 thus to more conveniently capture images. In other embodiments, the toggle switch 30 can be designed as other shapes according to preference.

It may be understood that the illustrated embodiment as shown in FIGS. 3-4 may have substantially the same circuit connection relationship as that of the illustrated embodiment disclosed in FIG. 2. Accordingly, FIGS. 1, 3-4 show that the USB keyboard has data functions and also camera functions. The camera functions as illustrated in FIGS. 1-4 may be used for motion sensing, taking a picture, and so on.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A keyboard comprising:
   a plug configured for connecting to a computer;
   a hub having an output terminal connected to the plug, a first input terminal, and a second input terminal;
   a keyboard controller;
   a keyboard circuit connected to the first input terminal of the hub via the keyboard controller;
   a camera controller; and
   an image capturing device mounted on the keyboard, and connected to the second input terminal of the hub via the camera controller, the image capturing device configuring for capturing sensed image signals of an environment surrounding the image capturing device;
   wherein the keyboard circuit communicates with the computer via the keyboard controller and the hub, and the image capturing device transmits the sensed image signals to the computer via the camera controller and the hub, wherein the keyboard further comprises a toggle switch mounted on the keyboard, the image capturing device is mounted on the toggle switch, the toggle switch can be toggled to protrude out of the keyboard when the image capturing device is in operation, and then can be pressed again to retract into the keyboard when the image capturing device is not in operation.

2. The keyboard of claim 1, wherein the image capturing device is mounted on a side of the toggle switch, facing an operational direction of the keyboard.

3. The keyboard of claim 1, wherein the toggle switch is installed on a top and center of the keyboard.

4. The keyboard of claim 1, wherein the plug is a universal serial bus (USB) plug, the hub is a USB hub, and the camera controller is a USB camera controller.

5. The keyboard of claim 1, wherein the image capturing device is an optical sensor.

* * * * *